US006825874B1

(12) United States Patent
Tripathy

(10) Patent No.: US 6,825,874 B1
(45) Date of Patent: Nov. 30, 2004

(54) MONITORING THE DEGREE OF ACTION IN VIDEO TRANSMISSIONS

(75) Inventor: Aurobindo Tripathy, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/461,470

(22) Filed: Dec. 14, 1999

(51) Int. Cl.$^7$ .............................................. H04N 17/00
(52) U.S. Cl. ................... 348/180; 348/184; 348/388.1; 348/700; 348/731; 725/9; 725/38
(58) Field of Search .................................. 348/180, 461, 348/184, 473, 474, 387.1, 388.1, 385.1, 390.1, 38, 154, 555, 155, 554, 731, 732, 700; 725/9, 14, 38, 27, 28; 345/717, 718

(56) References Cited

U.S. PATENT DOCUMENTS

| 3,603,729 | A | * | 9/1971 | Sperber .................... 348/154 |
| 4,112,463 | A | * | 9/1978 | Kamin ...................... 348/154 |
| 4,364,087 | A | * | 12/1982 | Storey et al. .............. 348/155 |
| 4,630,266 | A | * | 12/1986 | Deparis et al. ............ 370/252 |
| 5,272,527 | A | * | 12/1993 | Watanabe .................. 348/154 |
| 5,396,284 | A | * | 3/1995 | Freeman .................... 348/154 |
| 5,396,437 | A | * | 3/1995 | Takahashi .................. 382/309 |
| 5,471,239 | A | * | 11/1995 | Hill et al. .................. 348/155 |
| 5,526,050 | A |   | 6/1996 | King et al. |
| 5,526,427 | A | * | 6/1996 | Thomas et al. ............. 348/461 |
| 5,532,746 | A | * | 7/1996 | Chang ........................ 348/700 |
| 5,585,865 | A | * | 12/1996 | Amano et al. .............. 348/734 |
| 5,731,832 | A | * | 3/1998 | Ng ............................. 348/155 |
| 5,748,832 | A | * | 5/1998 | Takahashi .................. 386/101 |
| 5,801,765 | A | * | 9/1998 | Gotoh et al. ............... 348/155 |
| 5,841,941 | A | * | 11/1998 | Morimoto et al. ......... 386/104 |
| 5,867,205 | A |   | 2/1999 | Harrison |
| 5,878,222 | A |   | 3/1999 | Harrison |
| 5,963,256 | A | * | 10/1999 | Tahara ..................... 348/385.1 |
| 5,990,955 | A | * | 11/1999 | Koz ....................... 375/240.01 |
| 6,044,396 | A | * | 3/2000 | Adams ........................ 725/95 |
| 6,084,645 | A | * | 7/2000 | Park et al. .................. 348/731 |
| 6,084,910 | A | * | 7/2000 | Stanger et al. ......... 375/240.03 |
| 6,208,688 | B1 | * | 3/2001 | Seo et al. .............. 375/240.03 |
| 6,230,203 | B1 | * | 5/2001 | Koperda et al. ............ 370/463 |
| 6,233,226 | B1 | * | 5/2001 | Gringeri et al. ............ 370/252 |
| 6,259,733 | B1 | * | 7/2001 | Kaye et al. ................. 375/240 |
| 6,295,092 | B1 | * | 9/2001 | Hullinger et al. ........... 345/723 |
| 6,385,345 | B1 | * | 5/2002 | Ribas-Corbera et al. .... 382/239 |

FOREIGN PATENT DOCUMENTS

| EP | 0 869 684 A2 | 10/1998 |
| EP | 0 932 045 A2 | 7/1999 |
| EP | 0 948 206 A2 | 10/1999 |

OTHER PUBLICATIONS

Patent Abstract of Japan, vol. 2000, No. 01, Jan. 31, 2000 & JP 11 275037 A (Victor Co of Japan Ltd), Oct. 8, 1999 (1 pg).

* cited by examiner

Primary Examiner—Michael H. Lee
Assistant Examiner—Jean W. Désir
(74) Attorney, Agent, or Firm—Trop, Pruner & Hu, P.C.

(57) ABSTRACT

A system enables the user to monitor a number of channels to determine the degree of action occurring on each of those channels which are not currently tuned for reception. The system may develop a count of the number of packets received over a given period of time for a plurality of channels selected by the user and may advise the user when those channels exceed a preset level. Thus, the user may be advised when the action level on another channel exceeds a desired level allowing the user to tune to that channel if desired.

30 Claims, 4 Drawing Sheets

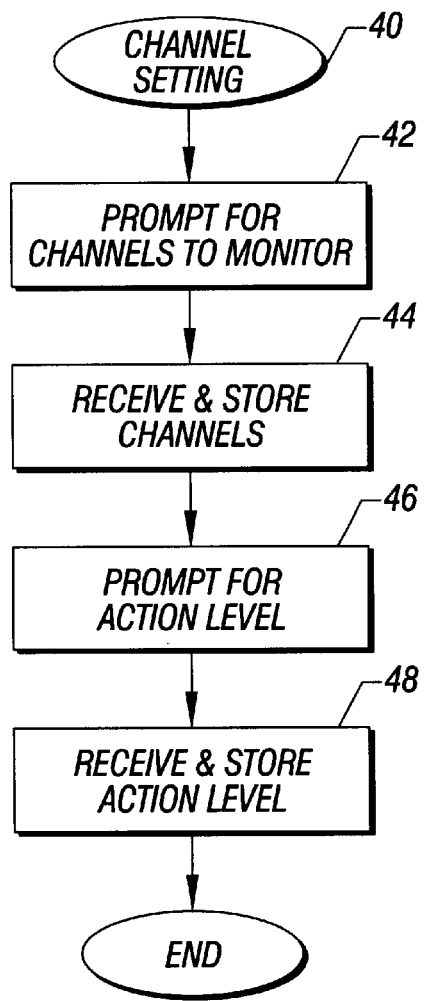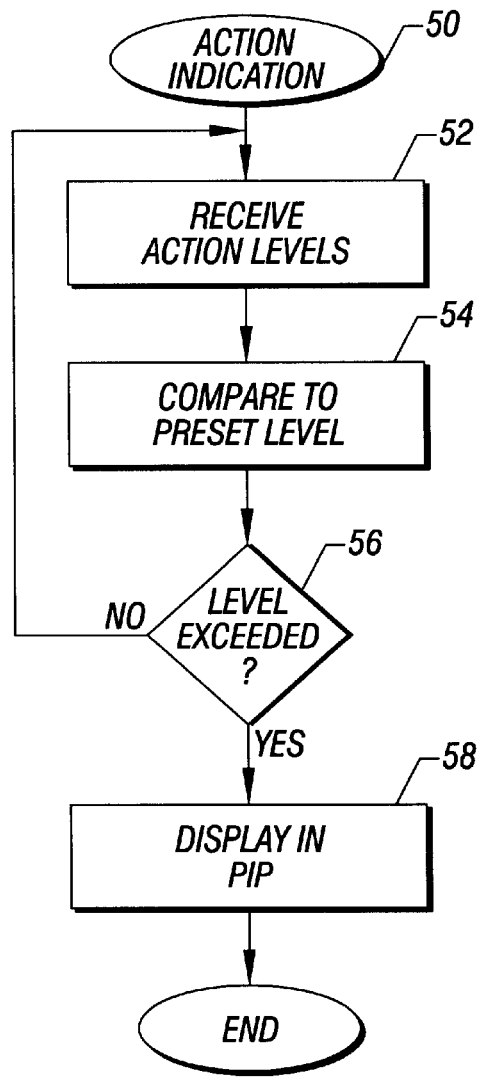
FIG. 5
FIG. 6

MONITORING THE DEGREE OF ACTION IN VIDEO TRANSMISSIONS

BACKGROUND

This invention relates generally to digital video display systems and in particular embodiments to systems adapted to display video television programs.

The convergence of the television receiver and the personal computer has accelerated recently with the advent of the set top computer systems. These systems, sometimes called set top boxes, use a conventional analog television receiver as a display for computer systems. In some cases, the set top box sits on top of the television receiver. By combining the capabilities of a computer system and a television, the system may provide advanced television programming features, such as an electronic programming guide, without requiring the user to incur any unnecessary costs for an additional monitor.

Digital format television broadcasts will be available soon. Currently, high definition television (HDTV) systems receive both digital and analog television broadcasts. The digital broadcast may include one of the various formats of high definition television.

The taste of television viewers varies across the gamut of ages and personality types. Moreover, some television viewers prefer television programs with a lot of action. These programs may be sporting events such as football games, so-called action movies and other types of programs. Some users "surf" through television channels attempting to locate programs which meet their tastes. Those who surf for so-called action programs must change from channel to channel, watch a portion of the program to see if the program meets their interests, and then switch to other programs until a suitable program is located.

Thus, it would be desirable to have an automatic technique for identifying video transmissions with a high degree of action.

SUMMARY

In accordance with one aspect, a method of receiving a digital video transmission includes receiving video data. Indicia of the amount of video data received over a given time interval is developed.

Other aspects are set forth in the accompanying detailed description and claims.

BRIEF DESCRIPTION OF THE DRAWINGS

FIGS. 5 and 6 are flow charts showing software for one embodiment of the present invention.

DETAILED DESCRIPTION

Figure 1:
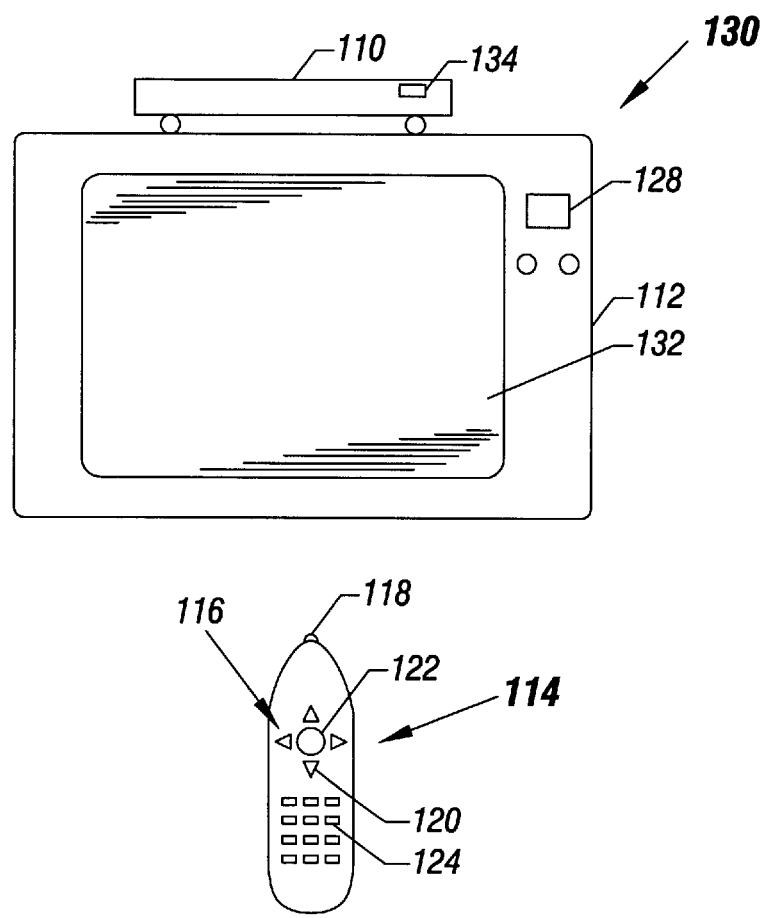
FIG. 1 is a front elevational view of one embodiment of the present invention.

Referring to FIG. 1, a processor-based system 130, illustrated as a set top computer system, includes a processor-based unit 110 which sits atop a television receiver 112. The television receiver 112 and the processor-based unit 110 may be controlled by a remote control unit 114.

The remote control unit 114 may communicate through its own transceiver 118 with a transceiver 134 on the processor-based unit 110 and a transceiver 128 on the television receiver 112. The communications between the remote control unit 114 and the television receiver 112/processor-based unit 110 may use any of a variety of airwave communications including infrared, ultrasonic or radiowave signaling.

While the present invention is illustrated in connection with a set top computer system, those skilled in the art will appreciate that the present invention is also applicable to any of a variety of other processor-based systems. Examples of other processor-based systems include desktop computers, laptop computers and a variety of processor-based appliances.

The remote control unit 114 may include a cursor control system 116 which operates essentially like a mouse. The RCU 114 may also include a mouse button 122 and a plurality of cursor direction control buttons 120. Thus, the position of a cursor or highlighting on a screen 132 may be controlled by operating one of the four direction control buttons 120. When the desired icon is indicated on the screen 132, it may be selected by operating the button 122. The remote control unit 114 may also include a numerical keypad 124.

Figure 2:
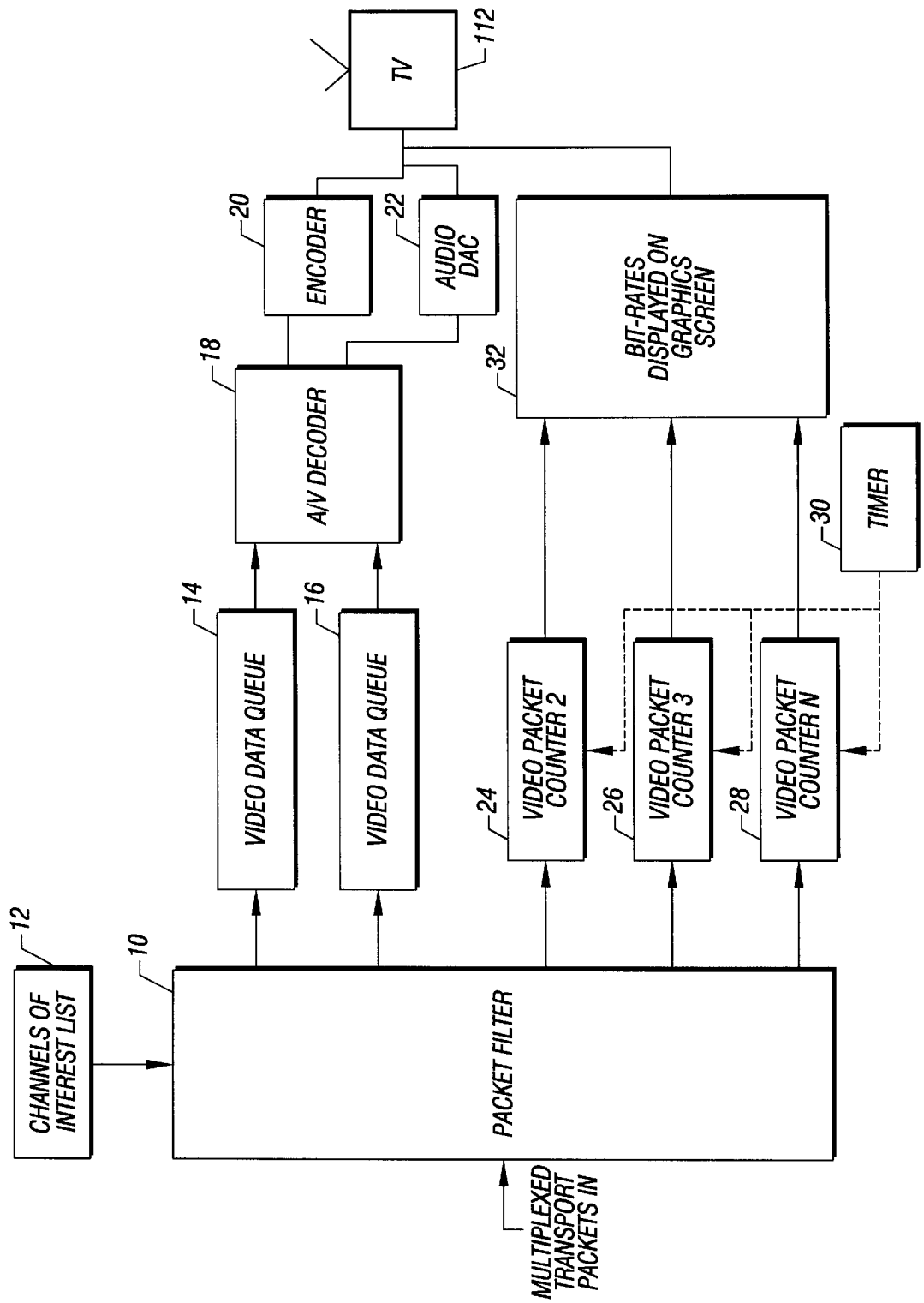
FIG. 2 is a block diagram for one embodiment for implementing a portion of the device shown in FIG. 1.

The processor-based unit 110 may include a tuner/capture card 162, as shown in FIG. 2. The card 162 may receive a multiplexed transport medium which provides a plurality of packets. A packet may include a header followed by a number of continuous bytes from an elementary data stream. An elementary data stream is a term for one of the coded video, coded audio or other coded bit streams.

A variety of standards for digital television broadcasts are available to designers. One such standard is the ATSC Digital Television Standard prepared by the Advanced Television Systems Committee dated Sep. 16, 1995. That standard describes a system for transmitting high quality compressed and multiplexed video and audio and ancillary data over a single six megahertz channel. A coded video source may have a resolution as high as five times that of conventional television.

Digital television systems may include source coding and compression, a service multiplex and transport and a radio frequency (RF)/transmission section. Source coding and compression refers to bit rate reduction methods, also known as data compression, appropriate for application to video, audio and ancillary digital data streams. The ancillary data may include control data and conditional access control data associated with the programmed audio and video services, such as closed captioning. The purpose of the source coding is to minimize the number of bits needed to represent the audio and video information. Digital television systems may employ the Moving Picture Experts Group ISO/IEL 13818-1 (MPEG-2 Systems) video streams syntax for coding of video and the ATSC A/52 Digital Audio Compression (AC-3) Standard (1995) for coding of audio.

Service multiplex and transport refers to a means of dividing the digital data stream into packets of information, the means of uniquely identifying each packet or packet type and appropriate methods of multiplexing video data stream packets, audio data stream packets, and ancillary data stream packets into a single data stream. Potential digital transport media include terrestrial broadcasting, cable distribution, satellite distribution, use of recording media and computer interfaces as examples.

RF/transmission refers to channel coding and modulation. The channel coder takes a bit stream and adds additional information that can be used by the receiver to reconstruct the data from the received signal which, due to transmission impairments, may not accurately represent the transmitted signal. The modulation uses the digital data stream information to modulate the transmitted signal.

Referring to FIG. 2, a packet filter 10, receives the service multiplex and transport. The packet filter 10 separates out a tuned channel and further separates the video and audio data for that tuned channel. Thus, the output signal of the packet filter 10 includes a video data queue 14 and an audio data queue 16 for a channel. The video and audio data is decoded in an audio/visual decoder 18.

The decoder 18 produces decompressed audio and video data which passes to an encoder 20 and an audio digital to analog converter 22. As a result, the information may be converted into an analog audio format compatible with a conventional analog television receiver. If the television receiver is a digital television receiver, the output of the decoder 18 may be coupled directly to the television 112.

The packet filter 10 may receive a list of channels of interest through an input device 12. The channels of interest are channels which the user wishes to have the system monitor to determine the degree of action on those channels. For each of the channels which are not currently tuned in but which are channels of interest, the system outputs the packets by channel to a plurality of counters 24, 26 and 28. Each counter 24, 26 and 28 counts the number of packets identified as video data.

The counters 24, 26 and 28 are coupled to a timer 30 so that a count of packets over a given time interval can be maintained for each selected channel. Each packet counter outputs a bit rate for a given channel. The bit rate is a rate at which the compressed bit stream is delivered from the channel to the input of the counter.

The filter 10 includes circuitry for parsing a packet identifier (PID) from the multiplexed transport stream of packets. The packet identifier is a unique integer value used to associate elementary streams of a program in a single or multi-program transport stream. Thus, the filter 10 filters the headers containing the packet identifiers. The filter 10 determines when a packet of interest has been encountered, for example, by scanning packet headers. The packet of interest may be the one to which the television receiver is currently tuned or any of the channels listed in the viewer's interest list.

Thus, the bit rate for each of the channels of interest may be provided to a display device 32 which may display the bit rates for the selected channels on the television 112 screen. For example, a variety of integrated circuit character generators are available to convert data into a display screen overlay. Alternatively, the display may be implemented using software.

Figure 3:
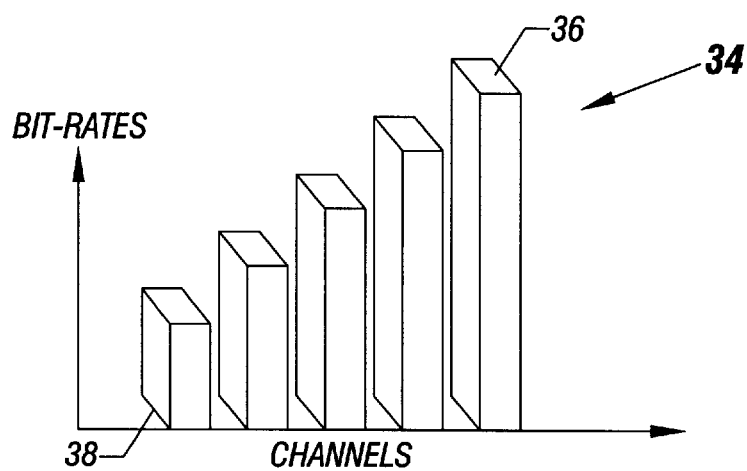
FIG. 3 is a graph of channel versus bit rate in accordance with one embodiment of the present invention.

Thus, referring to FIG. 3, the device 32 may produce a graph of bit rate versus channel, in accordance with one embodiment of the invention, so that the user can see the relative degree of action on each of the various channels which the user monitors. The user then may switch to another channel. For example, in one embodiment of the present invention, when the user cursor clicks on the graph for a given channel, such as a channel graphic 36 or 38, the receiver may be automatically tune to that channel. Alternatively, if the bit rate exceeds a preset level, the user may be immediately notified, for example, by displaying the other channel in a picture-in-picture display associated with the system 130.

The present invention is applicable to a variety of systems including digital systems using variable bit rates (VBRs). A variable bit rate is where the bit rate varies with time during the decoding of a compressed bit stream. In VBR streams, because slow moving scenes are easy to encode, they do not use as many bits as action packed scenes. The action packed scenes are hard to encode and use far more bits. Action scenes include fast moving action such as sports action. If the bit rate of all the channels or a select set of channels is monitored, then the user can be notified in real time of situations when the bit rate makes a significant increase. This may signify the beginning of an event that may be of the type the viewer wants to watch.

Figure 4:
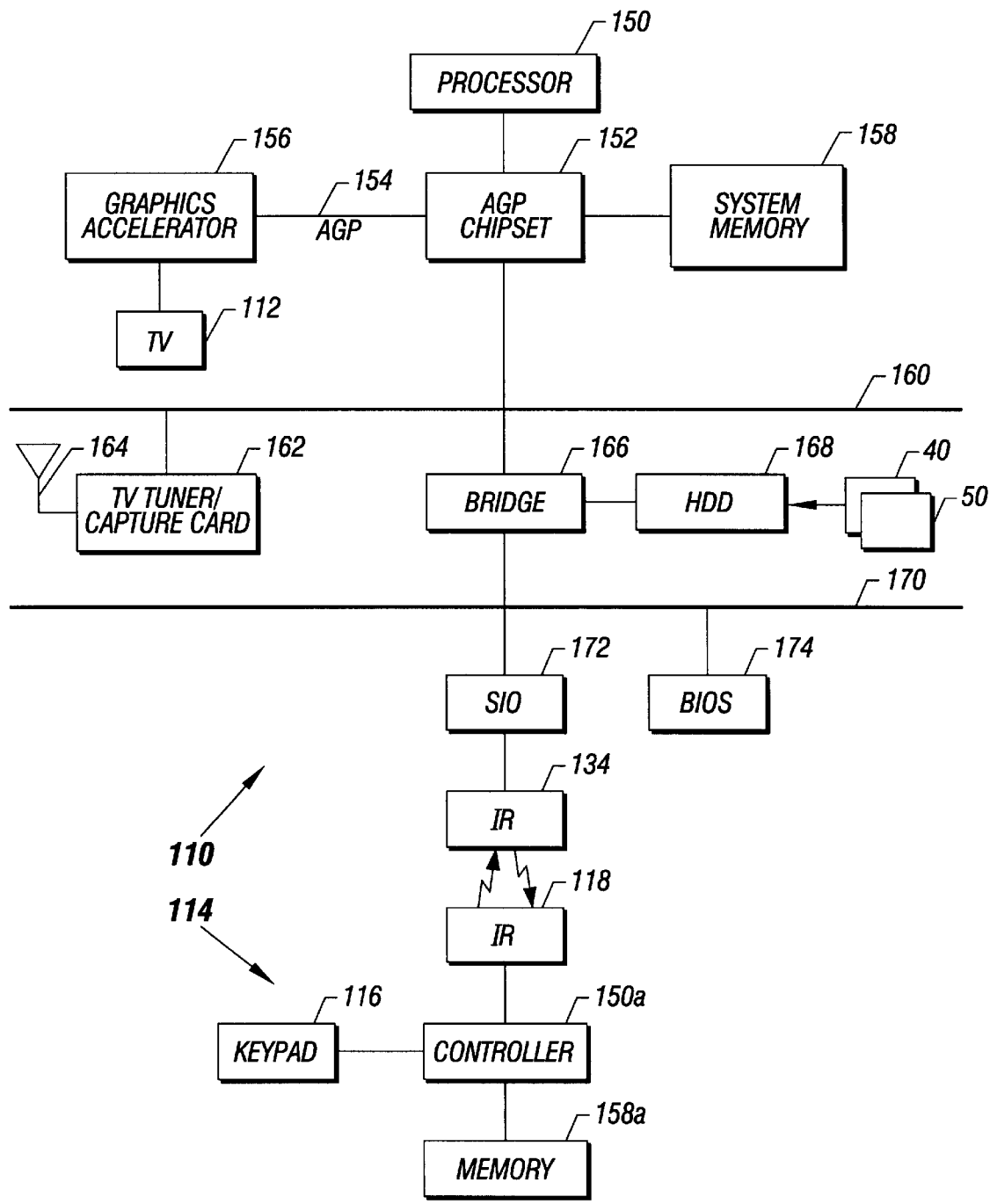
FIG. 4 is a block diagram for one embodiment of the system shown in FIG. 1.

Referring next to FIG. 4, a hardware implementation for the embodiment shown in FIG. 1 includes a processor 150. In one embodiment, the processor 150 may be coupled to an accelerated graphics port AGP (see Accelerated Graphics Port Interface Specification, Rev. 1.0, published Jul. 31, 1996 by Intel Corporation, Santa Clara, Calif.) chipset 152 for implementing an accelerated graphics port embodiment. The chipset 152 may communicate with the AGP port 154 and a graphics accelerator 156. The television 112 may be coupled to the video output of the graphics accelerator 156. The chipset 152 accommodates the system memory 158.

The chipset 152 may also be coupled to bus 160. The bus 160 couples a television tuner/capture card 162 which is coupled to an antenna 164 or other video input port, such as a cable input port, a satellite receiver/antenna or the like. The television tuner/capture card 162 selects a television channel and also performs a video capture function.

The bus 160 is also coupled to a bridge 166 which may couple a storage device such as a hard disk drive 168 or flash memory. The drive 168 may store the software 40 and 50 which may be responsible for providing the display illustrated in FIG. 3 and for implementing an automatic channel tuning embodiment.

The bridge 166 may also be coupled to another bus 170. The bus 170 may in turn be coupled to a serial input/output (SIO) device 172. The device 172 may be coupled to an infrared (IR) interface 134. Also connected to the bus 170 is a basic input/output system (BIOS) 174.

The IR interface 134 may communicate using infrared signals with an IR interface 118 on the RCU 114. Any of a variety of protocols may be utilized for implementing IR communications. In addition, other forms of airwave communications may be utilized as well.

The IR interface 118 on the RCU 114 communicates with a controller 150a which may be a processor such as a digital signal processor. The processor 150a communicates with the keypad 116 on the RCU 114 and the memory 158a. The memory 158a may conveniently be implemented by a flash memory.

Referring to FIG. 5, channel set-up software 40 may begin by prompting for channels to monitor (block 42). The user may input a plurality of channels which the system may monitor for action. The user input commands may be provided through the input device 12, such as a keyboard, and provided to the packet filter 10. The channels which are selected for monitoring are received and stored as indicated in block 44.

The user may then be asked to provide a preset action level which serves as the floor for providing a user notification when an actual detected action level exceeds a preset level, as indicated in block 46. The preset action level for each channel is then received and stored as indicated in block 48.

Referring next to FIG. 6, the software 50 for indicating the level of action begins by receiving the action levels from the card 162, as indicated in block 52. Those levels may be compared to the preset level previously provided by the user, as indicated in block 54. If the detected action level exceeds the preset level, as determined in diamond 56, the monitored channel with a high level of action may be displayed within a picture-in-picture display, as indicated in block 58, in one embodiment of the invention.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

receiving a plurality of channels of video;

monitoring the degree of action on each of said channels; and comparing indicia of the degree of action on a plurality of channels over a given time interval.

2. The method of claim 1 including comparing the indicia at the same time video data on another channel is being received and displayed.

3. The method of claim 1 wherein comparing indicia includes developing a count of the number of packets received for a given channel over a given period of time.

4. The method of claim 1 including comparing the indicia to a preset level and indicating whether the indicia exceeds said preset level.

5. An article comprising a medium for storing instructions that enable a processor-based system to:

receive a plurality of channels of video data;

monitor the degree of action on each of said channels;

compare indicia of the degree of action; and based on said comparison, select a given channel for viewing.

6. The article of claim 5 further storing instructions that cause a processor-based system to compare and count the number of packets received for a given channel over a given time period.

7. The article of claim 5 further storing instructions that cause a processor-based system to receive a plurality of user selected channels for monitoring indicia on the amount of video data received.

8. The article of claim 5 further storing instructions that cause a processor-based system to automatically select a given channel when the indicia indicates an amount of data received over a given time interval is above a preset level.

9. The article of claim 8 further storing instructions that cause a processor-based system to automatically display said channel in a picture-in-picture display.

10. The article of claim 5 further storing instructions that cause a processor-based system to compare the indicia at the same time video information is being received and displayed on another channel.

11. The article of claim 5 further storing instructions that cause a processor-based system to compare the indicia to a preset level and indicate whether the indicia exceeds said preset level.

12. The article of claim 5 further storing instructions that cause a processor-based system to compare indicia of the bit rate of data received.

13. A system that receives video information on one of a plurality of selectable channels comprising:

a tuner that tunes to one of said plurality of channels for viewing; and a device that monitors the degree of action on a channel not currently tuned for viewing.

14. The system of claim 13 wherein said device monitors the bit rate of video data.

15. The system of claim 13 wherein said device monitors the degree of action on a plurality of channels.

16. The system of claim 13 wherein said device compares the degree of action on a plurality of channels.

17. The system of claim 15 wherein said device automatically selects a channel for viewing based on the degree of action.

18. A method comprising:

receiving a plurality of channels of video;

monitoring the degree of action on said channels; and automatically selecting a given channel for viewing when the degree of action over a given time interval is above a pre set level.

19. The method of claim 18 wherein monitoring the degree of action includes developing indicia of the bit rate of data received.

20. The method of claim 19 wherein developing bit rate indicia includes developing a count of the number of packets received over a given time period.

21. The method of claim 18 including receiving a plurality of user selected channels for monitoring indicia on the amount of video data received over a given time interval.

22. The method of claim 18 including automatically displaying said given channel in a picture-in-picture display.

23. The method of claim 18 including comparing indicia of the amount of video data received on a plurality of channels over a given time interval.

24. The method of claim 23 including comparing the indicia at the same time video data on another channel is being received and displayed.

25. The method of claim 23 wherein comparing indicia includes developing a count of the number of packets received for a given channel over a given period of time.

26. A processor-based system comprising:

a processor;

a circuit coupled to said processor to receive video data on a plurality of channels and to monitor the degree of action on each of said channels; and software stored on a storage, said software to enable selection of a channel based on the degree of action on the selected channel.

27. The system of claim 26 wherein said circuit detects the bit rate of video data received on at least two channels.

28. The system of claim 27 further including a tuner, said circuit detecting the bit rate of data received on channels other than the channel that said tuner is tuned to receive.

29. The system of claim 26 wherein said software provides a graphical display of the degree of action of video data received on at least two channels.

30. The system of claim 29 wherein said software enables the user to automatically tune to a channel based on its degree of action.

* * * * *

UNITED STATES PATENT AND TRADEMARK OFFICE
CERTIFICATE OF CORRECTION

PATENT NO. : 6,825,874 B1
DATED : November 30, 2004
INVENTOR(S) : Aurobindo Tripathy It is certified that error appears in the above-identified patent and that said Letters Patent is hereby corrected as shown below:

Column 6,
Line 11, "claim 13" should be -- claim 15 --.

Signed and Sealed this

Twenty-second Day of February, 2005

JON W. DUDAS
*Director of the United States Patent and Trademark Office*